(12) United States Patent
Wang

(10) Patent No.: US 7,944,632 B2
(45) Date of Patent: May 17, 2011

(54) LENS MODULE AND CAMERA MODULE HAVING SAME

(75) Inventor: Chung-Pei Wang, Tucheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/507,990

(22) Filed: Jul. 23, 2009

(65) Prior Publication Data

US 2010/0053781 A1 Mar. 4, 2010

(30) Foreign Application Priority Data

Aug. 29, 2008 (CN) .......................... 2008 1 0304320

(51) Int. Cl.
*G02B 7/02* (2006.01)
(52) U.S. Cl. ........................................................ 359/819

(58) Field of Classification Search ........... 359/819–830
See application file for complete search history.

(56) References Cited

U.S. PATENT DOCUMENTS

| 3,904,278 | A  | * | 9/1975 | Hummel ........................ 359/823 |
| 6,172,822 | B1 | * | 1/2001 | Belliveau et al. .............. 359/819 |
| 6,215,604 | B1 | * | 4/2001 | Hori ............................... 359/819 |
| 7,111,999 | B2 | * | 9/2006 | Tsai ............................... 396/529 |
| 2009/0116118 | A1 | * | 5/2009 | Frazier et al. ................. 359/666 |

* cited by examiner

*Primary Examiner* — Darryl J Collins
(74) *Attorney, Agent, or Firm* — Raymond J. Chew

(57) ABSTRACT

An exemplary lens module includes a barrel and a plurality of deformable lenses received in the barrel. The barrel includes an inner wall. The inner wall has a plurality of circular retaining portions. The plurality of deformable lenses is deformed and retained in the plurality of circular retaining portions. Diameters of the lenses are greater than an inner diameter of the barrel. The lenses each has a curved surface.

16 Claims, 5 Drawing Sheets

LENS MODULE AND CAMERA MODULE HAVING SAME

BACKGROUND

1. Technical Field

The present disclosure relates to lens modules, and particularly, to a lens module having flexible lenses, and a camera module having the lens module.

2. Description of Related Art

Currently, glass lenses and plastic lenses are two typical optical lenses. Usually, each of the two typical optical lenses has a given curvature when it is produced, such that a certain optical effect can be achieved soon after the lens is produced.

However, a method of producing such lenses each having a preformed curvature is usually complex or expensive, because a mold having the curvature is needed.

Therefore, what is needed, is a lens module and a camera module having the lens module, which can overcome the above shortcomings.

BRIEF DESCRIPTION OF THE DRAWINGS

Many aspects of the present lens module and camera module can be better understood with reference to the following drawings. The components in the drawings are not necessarily to scale, the emphasis instead being placed upon clearly illustrating the principles of the present lens module and camera module. Moreover, in the drawings, like reference numerals designate corresponding parts throughout the several views.

DETAILED DESCRIPTION

Reference will now be made to the drawings to describe in detail of the exemplary embodiments of the lens module and the camera module.

Figure 1:
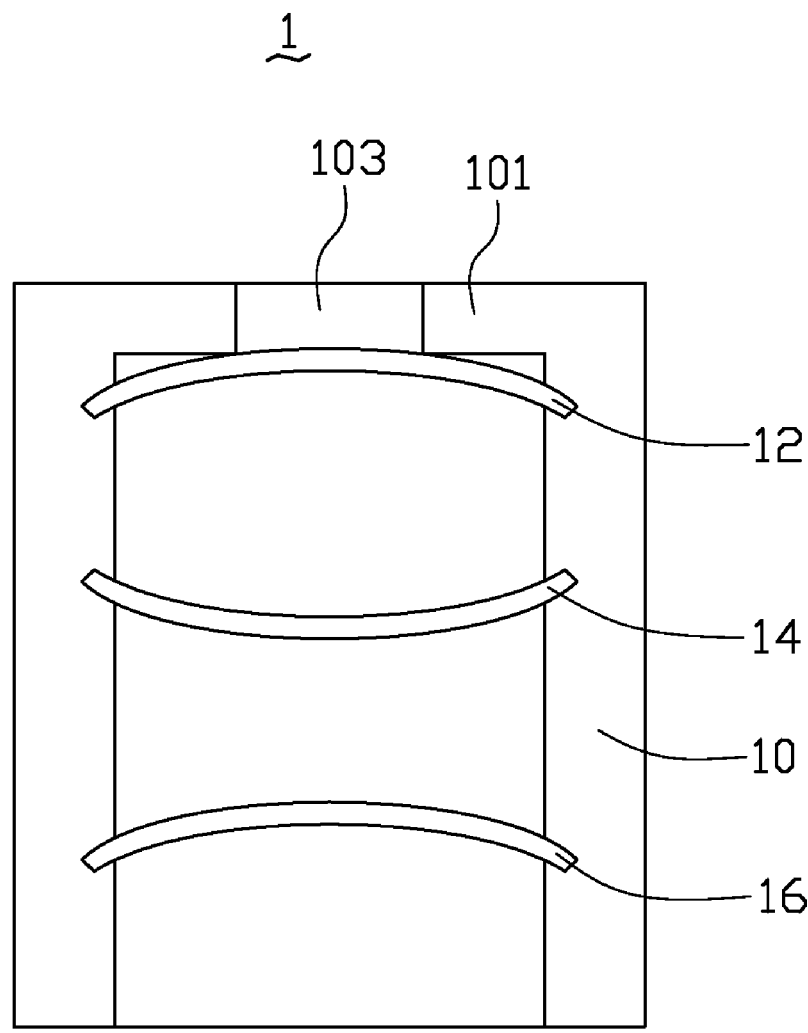
FIG. 1 is a schematic view of a lens module in accordance with a first embodiment, wherein the lens module includes a barrel.
Figure 2:
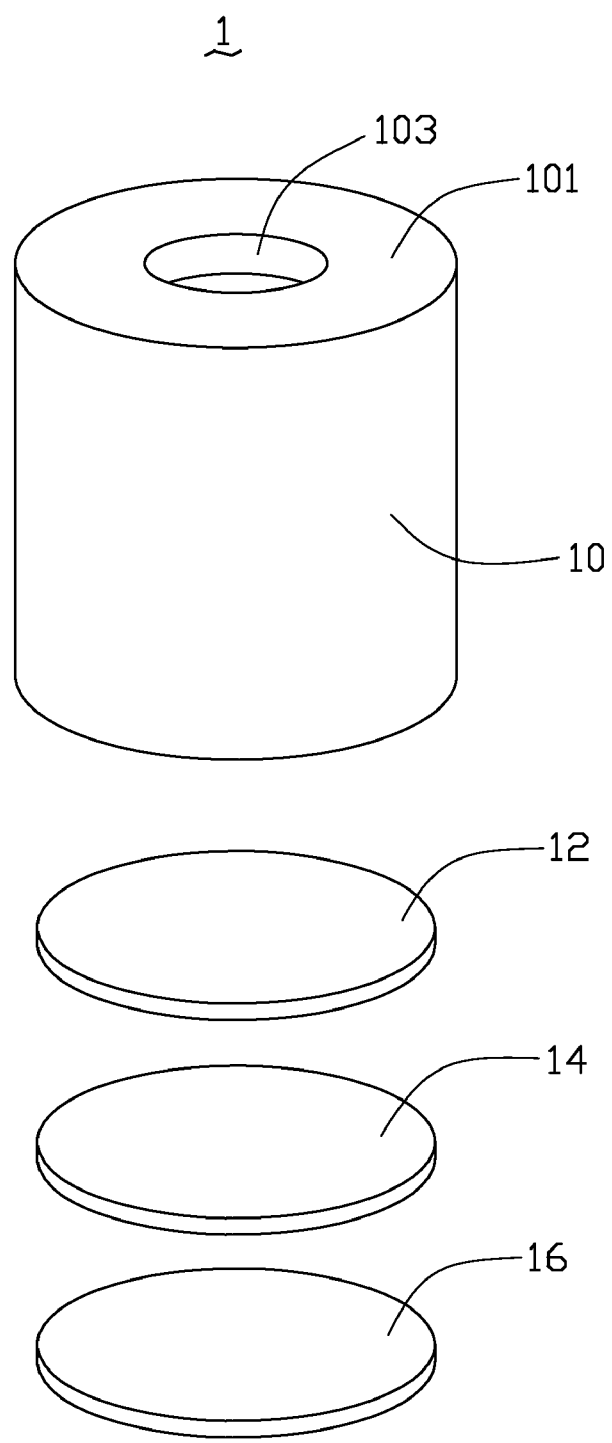
FIG. 2 is a schematic, exploded view of the lens module of FIG. 1.
Figure 3:
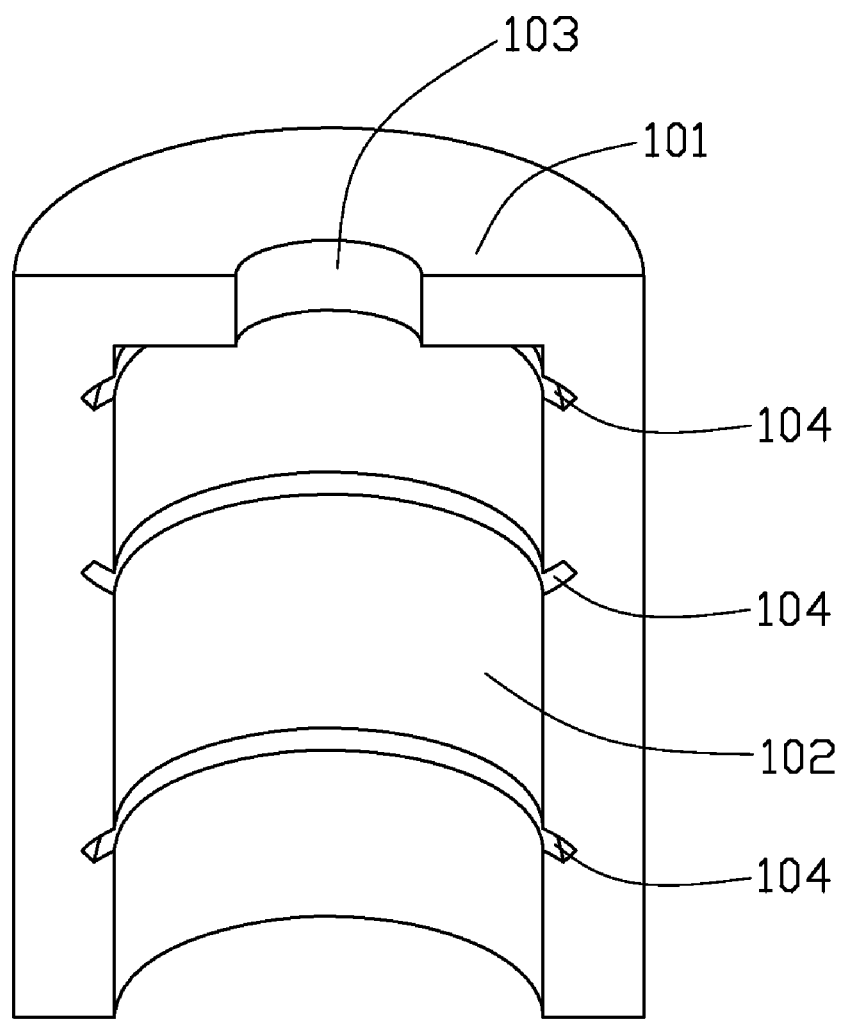
FIG. 3 is a schematic view of the barrel of the lens module of FIG. 1.

Referring to FIGS. 1 to 3, a lens module 1, in accordance with a first embodiment, includes a barrel 10 and three lenses 12, 14, 16.

The barrel 10 is columnar, and includes a first end 101 and an inner wall 102. The first end 101 defines a through hole 103, to allow outside light beams to pass through the first end 101 and enter the barrel 10. The inner wall 102 defines a plurality of annular grooves 104 configured for holding and fixing the lenses 12, 14, 16. The grooves 104 are spaced apart from each other and arranged in sequence along a longitudinal axis of the barrel 10. In the present embodiment, there are three grooves 104 for respectively holding and fixing the three lenses 12, 14, 16.

The three lenses 12, 14, 16 are transparent, flexible circular lenses. The lenses 12, 14, 16 are flat lenses when they are produced and before they are mounted to the barrel 10. The diameters of the lenses 12, 14, 16 are all greater than the inner diameter of the barrel 10. Each of the lenses 12, 14, 16 can have a same diameter with each other. In the present embodiment, the three lenses 12, 14, 16 are made of transparent plastic with excellent flexibility. The three lenses 12, 14, 16 are bent about the central axis of the barrel 10, and are respectively engaged with the three grooves 104 of the inner wall 102 of the barrel 10. The centers of three lenses 12, 14, 16 are located on the central axis of the barrel 10. Since the lenses 12, 14, 16 are flexible and the diameters of the lenses 12, 14, 16 are greater than the inner diameter of the barrel 10, the lenses 12, 14, 16 are capable of being bent to form a certain curvature, for implementing a certain optical effect.

Assembly of the lenses 12, 14, 16 to the barrel 10 can be done by the following steps. Firstly, the lens 12 is bent to a certain curvature by a clamp (not shown). Secondly, the lens 12 is held by a suction device (not shown), with the suction device catching the convexity of the lens 12 to keep the lens 12 in a bent state. Thirdly, the lens 12 is put into the corresponding groove 104 of the barrel 10 by the suction device. Fourthly, the suction device exits the barrel 10 and the lens 12 is engaged in the groove 104. Then, the lenses 14, 16 can be assembled with the barrel 10 using the same method.

The three lenses 12, 14, 16 are flat lenses before assembly, such that the lenses 12, 14, 16 are easy to be produced and the cost of the product is relatively cheap. In addition, the assembly of the lens module 1 is simple and easy, such that the cost of the lens module 1 is also relatively cheap.

Figure 4:
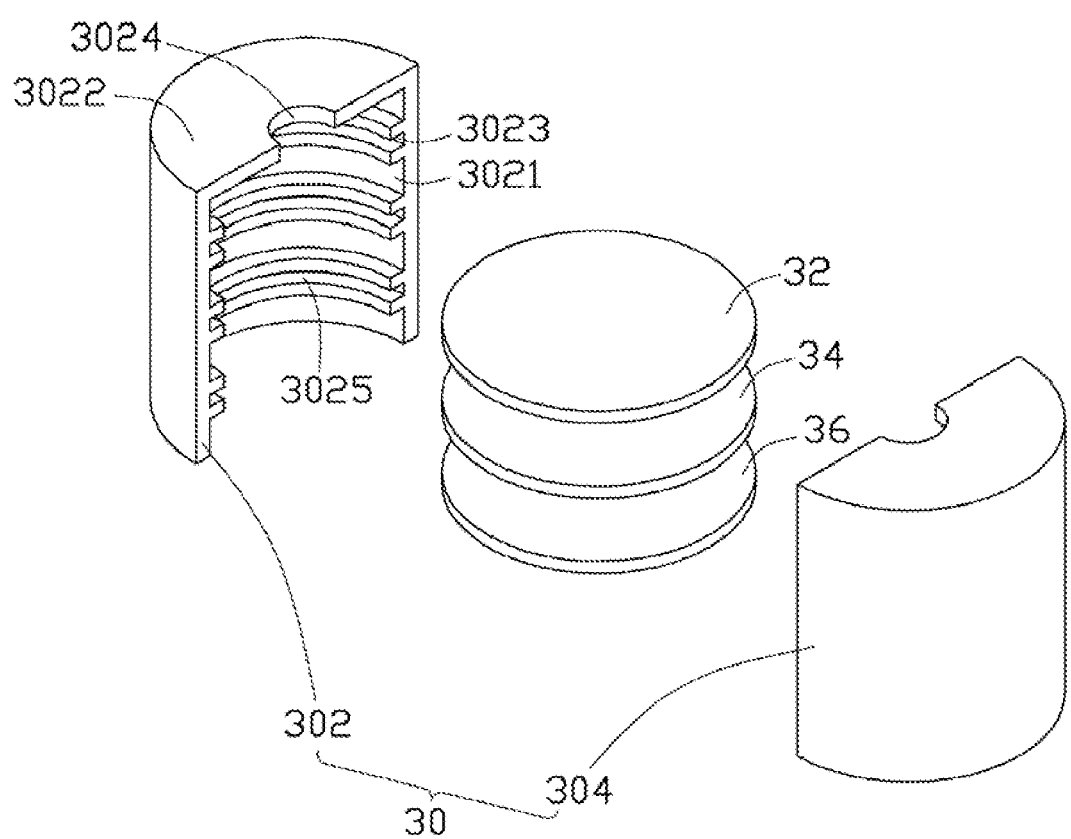
FIG. 4 is a schematic, exploded view of a lens module in accordance with a second embodiment.

Referring to FIG. 4, a lens module 3, in accordance with a second embodiment, includes a barrel 30 and three lenses 32, 34, 36. Compared with the first embodiment, the barrel 30 includes a first barrel part 302 and a second barrel part 304. The first barrel part 302 is symmetric with the second barrel part 304 about the central axis of the barrel 30. The first barrel part 302 is a hollow semi-cylinder, and includes an inner wall 3021 and an end 3022. The inner wall 3021 defines a plurality of group of annular protrusions 3023 surrounding the inner wall 3021, for respectively fixing the three lenses 32, 34, 36. One group of the annular protrusions 3023 includes two annular protrusions 3023, and the two annular protrusions 3023 cooperatively form a receiving space 3025 for receiving a lens therein. The end 3022 defines a semi-circular hole 3024 configured for allowing outside light beams to enter the barrel 30. The second barrel part 304 has the same structure as the first barrel part 302. The two barrel parts 302, 304 are engaged with each other to form the barrel 30. The first barrel part 302 and the second barrel part 304 can be engaged with each other by adhesive.

Assembly of the lenses 32, 34, 36 to the barrel 30 can be done by the following steps. Firstly, the three lenses 32, 34, 36 are bent to certain curvatures and put into the three groups of annular protrusions 3023 of the first barrel part 302 by a clamp (not shown). Secondly, the second barrel part 304 is engaged with the first barrel part 302 by adhesive, and the clamp is moved away. Thus, the three lenses 32, 34, 36 are fixed in the barrel 30.

It is understood that the number of lenses can be decided by practical need, and the number of grooves or groups of annular protrusions depends on the number of lenses. It is not limited to the present embodiments.

Figure 5:
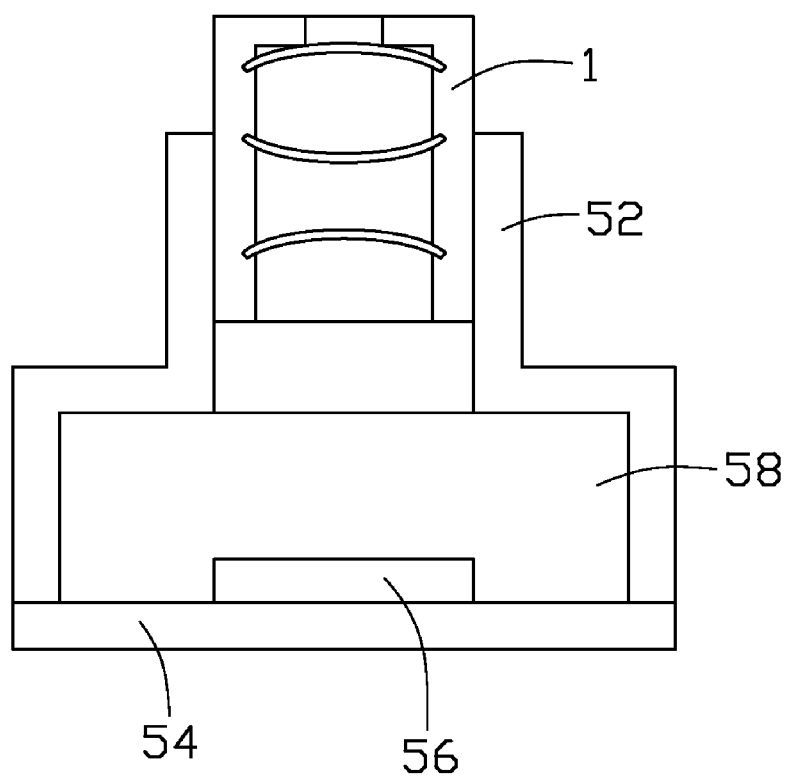
FIG. 5 is a schematic view of a camera module having the lens module of FIG. 1.

Referring to FIG. 5, a camera module 5 includes the above lens module 1, a holder 52, a circuit board 54 and an image sensor 56. The holder 52 is attached on the circuit board 54, and a receiving cavity 58 is formed. The image sensor 56 is attached on the circuit board 54 and arranged in the receiving cavity 58. The image sensor 56 is electrically connected with the circuit board 54 and the outer circuit (not shown). The lens module 1 is engaged with the holder 52, and configured for focusing light beams to the image sensor 56.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A lens module, comprising:
   a barrel comprising an inner wall, the inner wall having a plurality of circular retaining portions; and
   a plurality of deformable lenses deformed and retained in the plurality of circular retaining portions, diameters of the lenses being greater than an innermost diameter of the barrel, the lenses each having a curved surface, and the circular retaining portions each surrounding the optical axis of the corresponding deformable lens.

2. The lens module of claim 1, wherein the retaining portions comprise a plurality of circular grooves formed in the inner wall of the barrel, peripheries of the lenses being engaged in the respective grooves, and the circular grooves each surrounding the optical axis of the corresponding deformable lens.

3. The lens module of claim 1, wherein each of the retaining portions includes two annular protrusions formed on the inner wall of the barrel, peripheries of the lenses being sandwiched between the protrusions.

4. The lens module of claim 1, wherein the barrel comprises a first part and a second part, and the first part and the second part are engaged with each other by adhesive.

5. The lens module of claim 1, wherein the lenses are made of a transparent flexible plastic material.

6. The lens module of claim 1, wherein at least one of the lenses has opposite flat surfaces when in an undeformed state.

7. A camera module, comprising:
   a lens module comprising:
      a barrel comprising an inner wall, the inner wall having a plurality of circular retaining portions; and
      a plurality of deformable lenses deformed and retained in the plurality of circular retaining portions, diameters of the lenses being greater than innermost diameter of the barrel, the lenses being made of a transparent flexible material, the lenses each having a curved surface, and the circular retaining portions each surrounding the optical axis of a corresponding lens;
   a holder engaged with the barrel; and
   an image sensor received in the holder.

8. The camera module of claim 7, wherein the retaining portions comprise a plurality of circular grooves formed on the inner wall of the barrel, peripheries of the lenses being engaged in the grooves, and the circular grooves each surrounding the optical axis of the corresponding lens.

9. The camera module of claim 7, wherein each of the retaining portions includes two annular protrusions formed on the inner wall of the barrel, peripheries of the lenses being sandwiched between the protrusions.

10. The camera module of claim 7, wherein the barrel comprises a first part and a second part, and the first part and the second part are engaged with each other by adhesive.

11. The camera module of claim 7, wherein the lenses are made of a transparent flexible plastic material.

12. The camera module of claim 7, wherein each of the lenses in an undeformed state includes opposite flat surfaces.

13. A method for assembling a lens module, comprising:
   providing a flat transparent flexible plate and a barrel, the barrel comprising an inner wall, the inner wall having a circular retaining portion;
   bending the transparent flexible plate to a certain curvature by a clamp to form a lens;
   holding the lens by a suction device, with the suction device catching the convexity of the lens to keep the lens in a bent state;
   putting the lens into the circular retaining portion by the suction device; and
   removing the suction device from the barrel, thereby obtaining the lens module with the lens engaged with the circular retaining portion.

14. The method of claim 13, wherein the circular retaining portion surrounds the optical axis of the lens.

15. The method of claim 13, wherein the circular retaining portion comprises a circular groove formed in the inner wall of the barrel, a periphery of the lens being engaged in the groove, and the circular groove surrounding the optical axis of the lens.

16. The method of claim 13, wherein the circular retaining portion includes two annular protrusions formed on the inner wall of the barrel, a periphery of the lens being sandwiched between the protrusions.

* * * * *